US010002294B2

United States Patent
Demizu et al.

(10) Patent No.: US 10,002,294 B2
(45) Date of Patent: *Jun. 19, 2018

(54) IMAGE MONITORING SYSTEM AND IMAGE MONITORING PROGRAM

(71) Applicant: Sony Corporation, Tokyo (JP)

(72) Inventors: Masaki Demizu, Kanagawa (JP); Miki Murakami, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/647,907

(22) Filed: Jul. 12, 2017

(65) Prior Publication Data

US 2017/0308748 A1 Oct. 26, 2017

Related U.S. Application Data

(63) Continuation of application No. 14/700,833, filed on Apr. 30, 2015, now Pat. No. 9,740,933, which is a
(Continued)

(30) Foreign Application Priority Data

Mar. 6, 2006 (JP) .................................. 2006-059261

(51) Int. Cl.
*G06K 9/00* (2006.01)
*G06T 7/285* (2017.01)
(Continued)

(52) U.S. Cl.
CPC .......... *G06K 9/00624* (2013.01); *G06T 7/285* (2017.01); *H04N 7/0117* (2013.01); *H04N 7/18* (2013.01)

(58) Field of Classification Search
CPC .. G06K 9/00261; G06K 9/62; G06K 9/00771; G06K 9/3241; G06K 9/00624; H04N 7/0117; G06T 7/0042; G06T 7/18
See application file for complete search history.

(56) References Cited

U.S. PATENT DOCUMENTS 3,331,069 A * 7/1967 Cornell .................... G01S 1/02
342/160
5,717,470 A 2/1998 Jung
(Continued)

FOREIGN PATENT DOCUMENTS

JP 5 14897 1/1993
JP 11 355762 12/1999
(Continued)

*Primary Examiner* — Ali Bayat
(74) *Attorney, Agent, or Firm* — Haug Partners LLP; William S. Frommer

(57) ABSTRACT

An image monitoring system includes a recorder that records an image captured by a camera via a network. The system is controlled to display the present image captured by the camera or a past image recorded on the recorder. A moving object is detected from the image captured by the camera, the detector including a resolution converter for generating an image with a resolution lower than the resolution of the image captured by the camera. A moving object is detected from the image generated by the resolution converter and positional information on the detected moving object is output. The positional information of the detected moving object is merged with the image captured by the camera on the basis of the positional information.

18 Claims, 5 Drawing Sheets

Related U.S. Application Data continuation of application No. 13/845,170, filed on Mar. 18, 2013, now Pat. No. 9,047,517, which is a continuation of application No. 11/713,326, filed on Mar. 2, 2007, now Pat. No. 8,421,866.

(51) Int. Cl.
*H04N 7/01* (2006.01)
*H04N 7/18* (2006.01)

(56) References Cited

U.S. PATENT DOCUMENTS

| | | | |
|---|---|---|---|
| 6,269,484 B1 | 7/2001 | Simsic et al. | |
| 6,421,466 B1 | 7/2002 | Lin | |
| 7,813,581 B1 | 10/2010 | Fitzpatrick | |
| 7,860,344 B1 | 12/2010 | Fitzpatrick | |
| 2004/0066970 A1* | 4/2004 | Matsugu | G06K 9/20 382/217 |
| 2004/0141067 A1 | 7/2004 | Nakayama | |
| 2005/0084133 A1 | 4/2005 | Kawakami et al. | |
| 2005/0123201 A1* | 6/2005 | Nakashima | G06T 7/20 382/195 |
| 2005/0219594 A1 | 10/2005 | Miyarnoto et al. | |
| 2006/0050320 A1 | 3/2006 | Ozaki et al. | |
| 2006/0083440 A1 | 4/2006 | Chen | |
| 2006/0170769 A1 | 8/2006 | Zhou | |
| 2007/0153091 A1 | 7/2007 | Watlington | |
| 2008/0278584 A1 | 11/2008 | Shih et al. | |
| 2009/0306741 A1* | 12/2009 | Hogle | A61N 1/36082 607/54 |
| 2012/0050474 A1 | 3/2012 | Segall | |
| 2013/0094759 A1 | 4/2013 | Yagi et al. | |
| 2017/0021275 A1* | 1/2017 | Zalewski | A63F 13/02 |

FOREIGN PATENT DOCUMENTS

| | | |
|---|---|---|
| JP | 2003 348569 | 12/2003 |
| JP | 2005 159923 | 6/2005 |
| WO | WO 98 08208 | 2/1998 |

\* cited by examiner

IMAGE MONITORING SYSTEM AND IMAGE MONITORING PROGRAM

CROSS REFERENCES TO RELATED APPLICATIONS

This is a Continuation of application Ser. No. 14/700,833, filed Apr. 30, 2015; which is a Continuation of application Ser. No. 13/845,170, filed Mar. 18, 2013, now U.S. Pat. No. 9,047,517, issued on Jun. 2, 2015, which is a Continuation of application Ser. No. 11/713,326, filed Mar. 2, 2007, now U.S. Pat. No. 8,421,866, issued on Apr. 16, 2013, which is entitled to the priority filing date of Japanese application no. 2006-059261, filed Mar. 6, 2006, the entirety of which is incorporated herein by reference.

BACKGROUND OF THE INVENTION

1. Field of the Invention

The present invention relates to an image monitoring system and an image monitoring program that can display an image in a camera connected to a network and that can record and reproduce the captured image, and in particular, it relates to an image monitoring system and an image monitoring program equipped with the function of detecting a moving object in the captured image.

2. Background Art

Image monitoring systems are systems that display images captured by a plurality of cameras on a monitor in split views to allow the images to be watched at one place at the same time and that record the captured images and reproduce the past images as necessary. In recent years, such image monitoring has been executed, in view of improvement in security, not only inside and outside of banks and shops such as convenience stores but also in companies, parking lots, streets, schools, apartments, detached houses, and other places.

On the other hand, network-ready image monitoring systems have appeared in which a plurality of cameras is connected to a network so as to allow management of display, storage, and reproduction of images via the network, as image-capture cameras have become sophisticated and fallen in price, recording media have increased in capacity and fallen in price, and networks have developed.

Such image monitoring systems have the function of detecting a moving object from images captured by cameras, which is applied to monitoring works. This moving-object detecting function is used for operations such as finding a difference in pixel value between the present frame and a preceding frame to detect a moving object according to the value of the difference or the size of the area where the difference occurs, displaying the position of the moving object on monitors, or recording an image only when detecting a moving-object (for example, refer to JP-A-9-186988).

SUMMARY OF THE INVENTION

However, such moving-object detecting function uses many CPUs and memory resources because all the images sent from cameras one by one are subjected to operations, resulting in application of a heavy load on the system. Particularly, with network-ready image monitoring systems to which a plurality of cameras can be connected, when moving-object detection is carried out for all the images sent from the cameras via a network, an excessive load will be applied to the systems.

According to an embodiment of the invention, there is provided an image monitoring system including: recording means for recording an image captured by a camera via a network; control means for controlling the system so as to display the present image captured by the camera or a past image recorded on the recording means on display means; and moving-object detecting means for detecting a moving object from the image captured by the camera. The moving-object detecting means includes resolution conversion means for generating an image with a resolution lower than the resolution of the image captured by the camera, positional-information output means for detecting a moving object from the image generated by the resolution conversion means and outputting positional information on the detected moving object, and information merging means for merging the positional information of the moving object with the image captured by the camera on the basis of the positional information of the moving object output by the positional-information output means.

According to an embodiment of the invention, there is provided an image monitoring program executed by the image monitoring system, in which the moving-object detecting means generates an image with a resolution lower than the resolution of the image captured by the camera, detects a moving object from the low-resolution image, and merges the positional information of the detected moving object with the image captured by the camera.

According to an embodiment of the invention, in the process of detecting a moving object from an image by moving-object detecting means, an image with a resolution lower than that of the image captured by the camera, and moving-object detection is performed using the low-resolution image. Thus the load of the process of detecting a moving object can be reduced.

Accordingly, in the image monitoring system with a moving-object detecting function according to the embodiments of the invention, consumption of system resources for detecting a moving object can be reduced and the overall performance can be improved.

DESCRIPTION OF PREFERRED EMBODIMENTS

Figure 1:
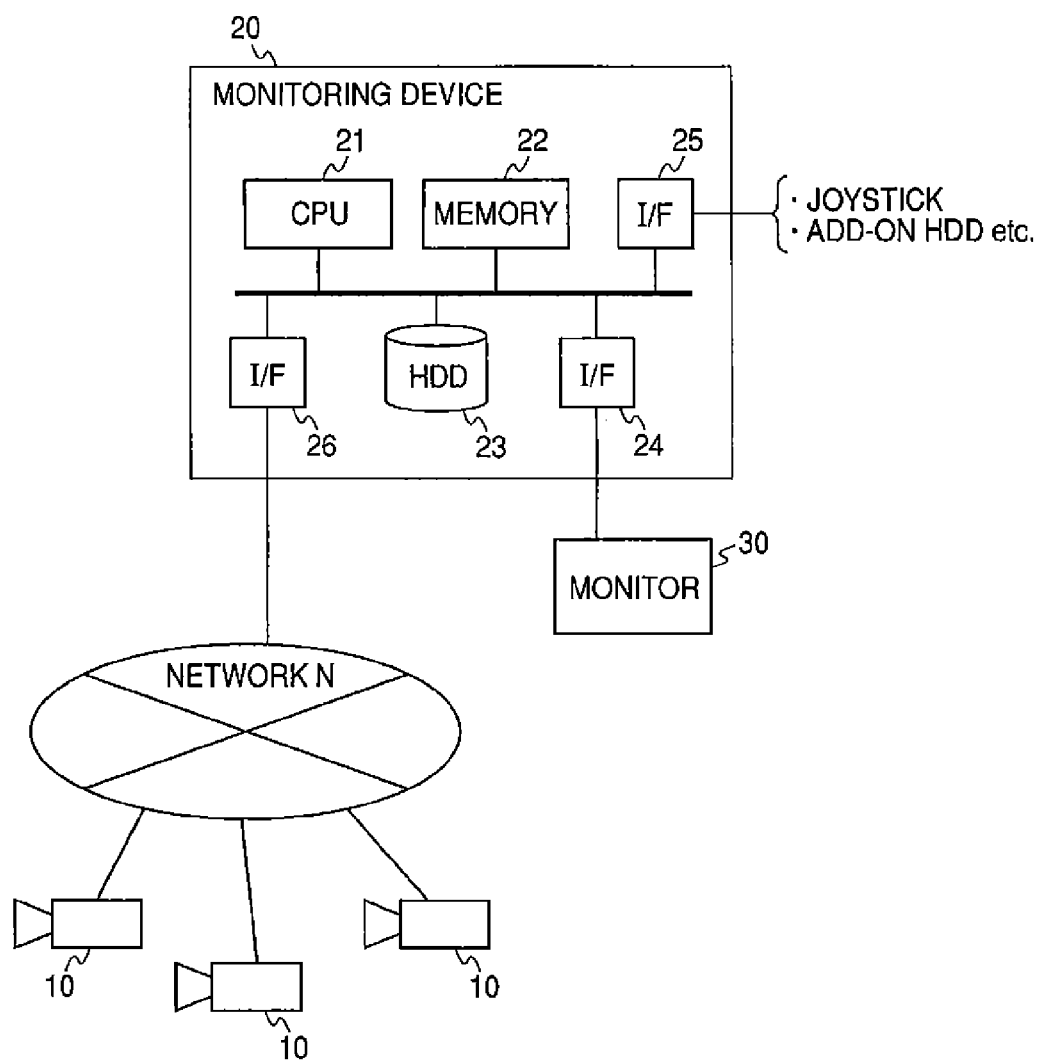
FIG. 1 is a schematic diagram of the structure of an image monitoring system according to an embodiment of the invention.

An embodiment of the invention will be described hereinbelow with reference to the drawings. FIG. 1 is a schematic diagram of the structure of an image monitoring system according to the embodiment; and FIG. 2 is a schematic diagram of the structure of an image monitoring program according to the embodiment.

As shown in FIG. 1, the image monitoring system according to the embodiment includes a camera 10 (or more) connected to a network N, a monitoring device 20 connected to the network N, and a monitor (display means) 30 connected to the monitoring device 20. The image monitoring system sends an image captured by the camera 10 to the monitoring device 20 in a specified data format (for example, Joint Photographic Experts Group (JPEG) or Moving Picture Experts Group phase 4 (MPEG-4) via the network N to allow the present image to be displayed on the monitor 30 connected to the monitoring device 20, and the sent image to be recorded on a hard disk drive (HDD) 23 which is recording means provided in the monitoring device 20. The image monitoring system also allows a past image recorded on the HDD 23 to be searched for and reproduced.

To manage the images sent from the camera 10 via the network N, the monitoring device 20 includes a CPU 21 serving as control means that executes an image monitoring program, a memory 22 such as a random access memory (RAM) for use as a work area in image processing etc., and the HDD 23 serving as the recording means in which images sent from the camera 10 are stored one after another. The monitoring device 20 also includes a monitor interface 24 for connecting the monitor 30, an external unit interface 25 for connecting external units including a joystick and an add-on HDD, and a network interface 26 for inputting and outputting to/from the network N.

Figure 2:
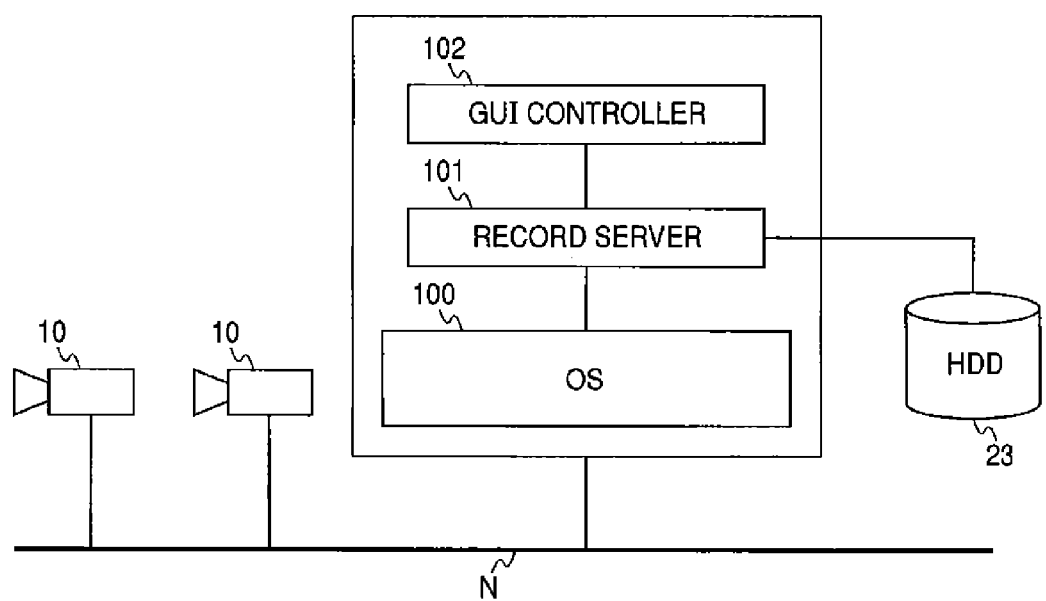
FIG. 2 is a schematic diagram of the structure of an image monitoring program according to an embodiment of the invention.

As shown in FIG. 2, the image monitoring program executed by the CPU 21 includes a record server 101 executed on an operating system 100 and a graphical user interface (GUI) controller 102. The record server 101 manages the images sent from the camera 10 together with a camera identification number, record date, and compression format, and records them on the HDD 23 to create an image database. The record server 101 also searches the HDD 23 for a past image and reproduces it according to the instruction of the user.

The GUI controller 102 controls the window of the monitor 30 (see FIG. 1) for displaying images thereon, assignment of the images on the window, the display of various control buttons (icons) on the window, and acceptance of instructions from the user with input means such as a mouse, a keyboard, function buttons, or a joystick.

With the system configuration and program configuration, an image captured by the camera 10 is sent to the monitoring device 20 via the network N and displayed on the monitor 30. When a plurality of cameras 10 is connected, images captured by the cameras 10 are displayed on the respective windows of the monitor 30, or only a window for a specific camera 10 is displayed on the entire screen of the monitor 30. When the camera 10 has a pan/tilt/zoom function, an image can be displayed through the pan/tilt/zoom of the camera 10 by the control of the user.

The images captured by the camera 10 are recorded on the HDD 23 one after another to create an image database. When the image database is created in the HDD 23, the user can access the image database from the monitoring device 20 to read a desired image, and can also access the image database from an external personal computer or the like connected to the same network N to see a desired image, because the monitoring device 20 is also connected to the network N.

The image monitoring system of the embodiment has the function of detecting a moving object from an image captured by the camera 10. Particularly, an advantage of this embodiment is that little load is applied on the system owing to the moving-object detecting function.

The moving-object detecting function is achieved by the control of the GUI controller 102 shown in FIG. 2, which is particularly effective in detecting a moving object in the images captured by a plurality of cameras.

Figure 3:
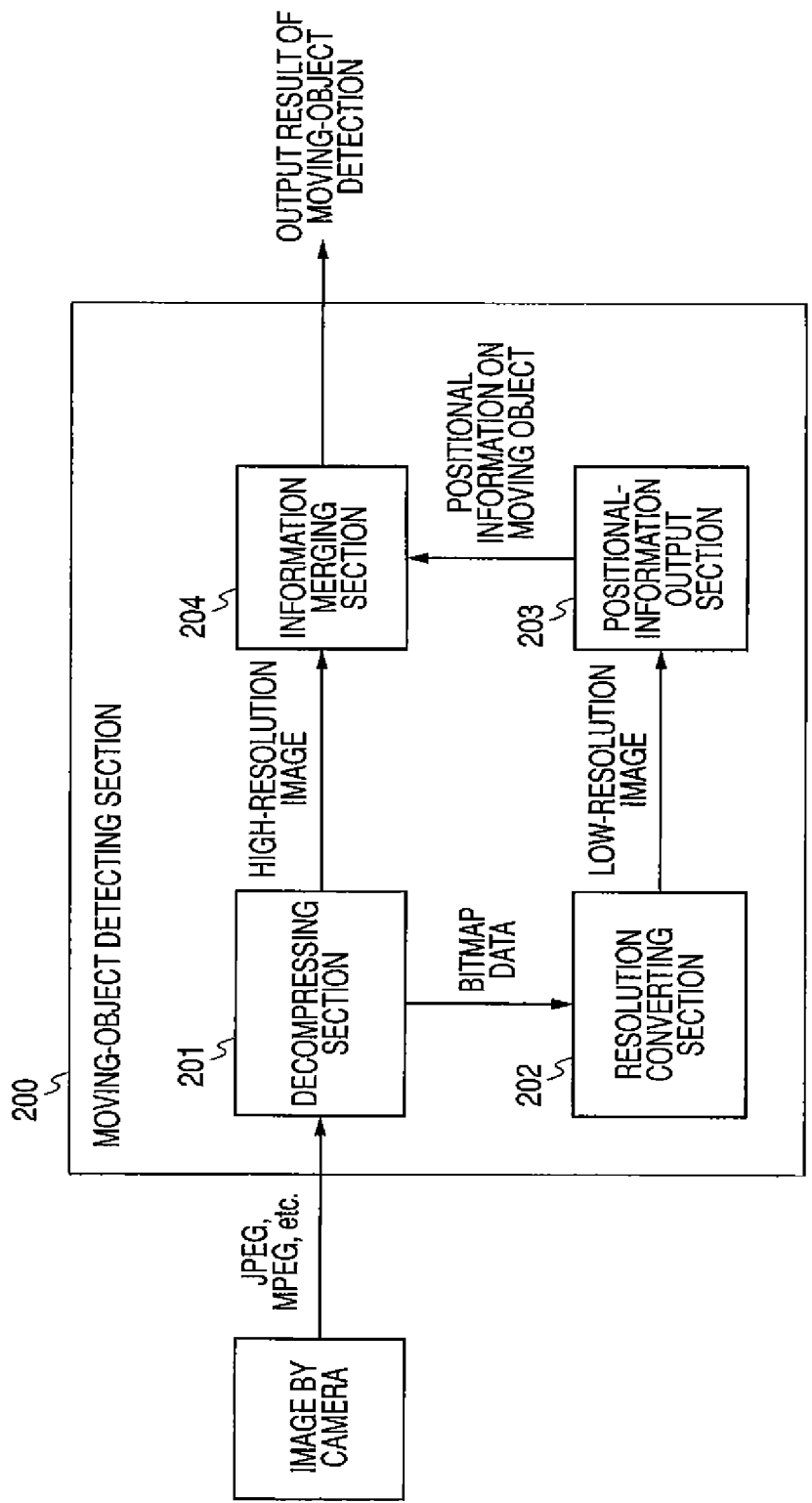
FIG. 3 is a block diagram of a moving-object detecting section for use in the image monitoring system of the embodiment.

FIG. 3 is a block diagram of a moving-object detecting section, denoted by 200, for use in the image monitoring system of the embodiment. The moving-object detecting section 200 includes a decompressing section 201 that decompresses an image in compressed format (for example, JPEG or MPEG format) sent from the camera 10 to bitmap data, a resolution converting section 202 that decreases the resolution of the decompressed bitmap data to output a low-resolution image, a positional-information output section 203 that detects a moving object from the low-resolution image to output moving-object positional information, and an information merging section 204 that merges the moving-object positional information output from the positional-information output section 203 with the high-resolution bitmap data output from the decompressing section 201.

The image in the camera 10 is sent in a specified compressed format to the monitoring device 20 via a network. To detect a moving object in the image sent to the monitoring device 20, the image is sent to the moving-object detecting section 200, where it is subjected to a specified moving-object detecting process, and the detection result is output.

In a normal moving-object detecting process, a compressed image is decompressed to bitmap data, in which a difference in pixel value between frames is calculated to thereby detect a moving-object. However, it applies a heavy operation load and takes much time to execute the moving-object detecting process on high-resolution bitmap data and, moreover, moving-object detection for the images in multiple cameras will apply a significant load on the system.

In this embodiment, a compressed image is decompressed into bitmap data, and then the resolution of the bitmap data is reduced to generate low-resolution bitmap data, to which a moving-object detecting process such as an inter-frame differential operation is applied. This reduces the load on the operation for detecting a moving object, allowing moving-object detection in a short time.

It is enough for the moving-object detection only if the position of a moving-object, even with low resolution, can be sensed. Accordingly, if the positional information of a moving object (for example, the positional information of a rectangular frame around the moving object) is output from the positional-information output section 203, the positional information of the moving object can be accurately merged with the original bitmap data by converting the positional information according to the high-resolution bitmap data.

Figure 4:
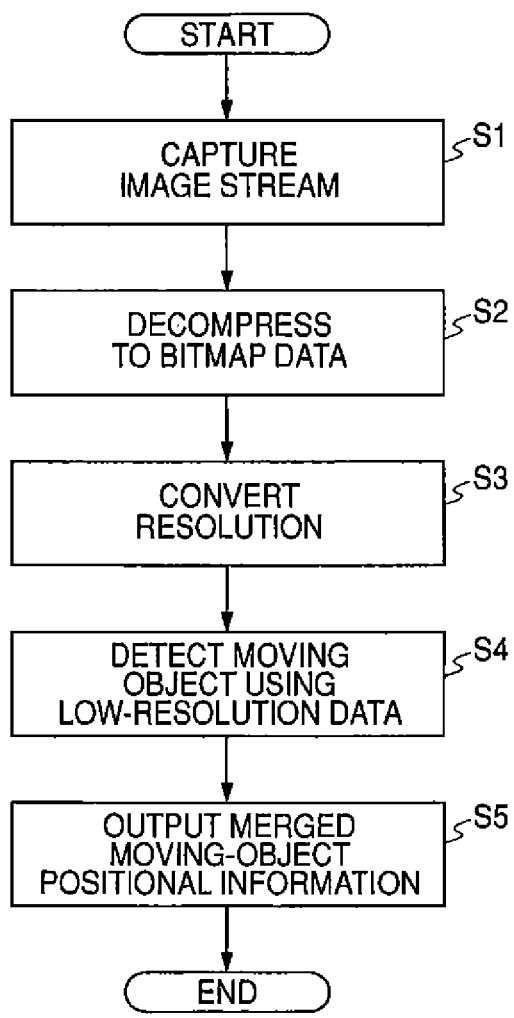
FIG. 4 is a flowchart for a moving-object detection process which is the image monitoring program of the embodiment.

FIG. 4 is a flowchart for the moving-object detection process which is an image monitoring program of the embodiment. First, an image stream sent from a camera is captured (step S1), which is then decompressed to bitmap data (step S2).

Next, the bitmap data is subjected to resolution conversion to decrease the resolution (step S3). The low-resolution bitmap data is used to detect a moving object (step S4). In the moving-object detection process, the positional information of a moving object in the image can be outputted. The positional information is merged with the original bitmap data, and is output (step S5).

To merge the positional information with the original bitmap data, the positional information is subjected to resolution conversion reverse to that in step S3 so that the resolution agrees with the resolution of the original bitmap data. Thus, the low-resolution positional information can be properly agreed with the high-resolution bitmap data.

In this embodiment, the resolution of the image captured by a camera, even though it is high, is reduced in the moving-object detecting process. Thus hardware resources such as a CPU and a memory can be used for other processes without the need for using the hardware resources in the detection process.

In the above example, moving-object detection is executed with low-resolution bitmap data, and then it is merged with the original-resolution bitmap data. However, if the resolution in displaying images on a monitor is different from the original resolution, the positional information obtained by moving-object detection may be converted to the resolution at the time of monitor display. When the resolution at display is equal to that at moving-object detection such as when the window for image display is small, the positional information of the moving object may be merged without converting the resolution.

Figure 5:
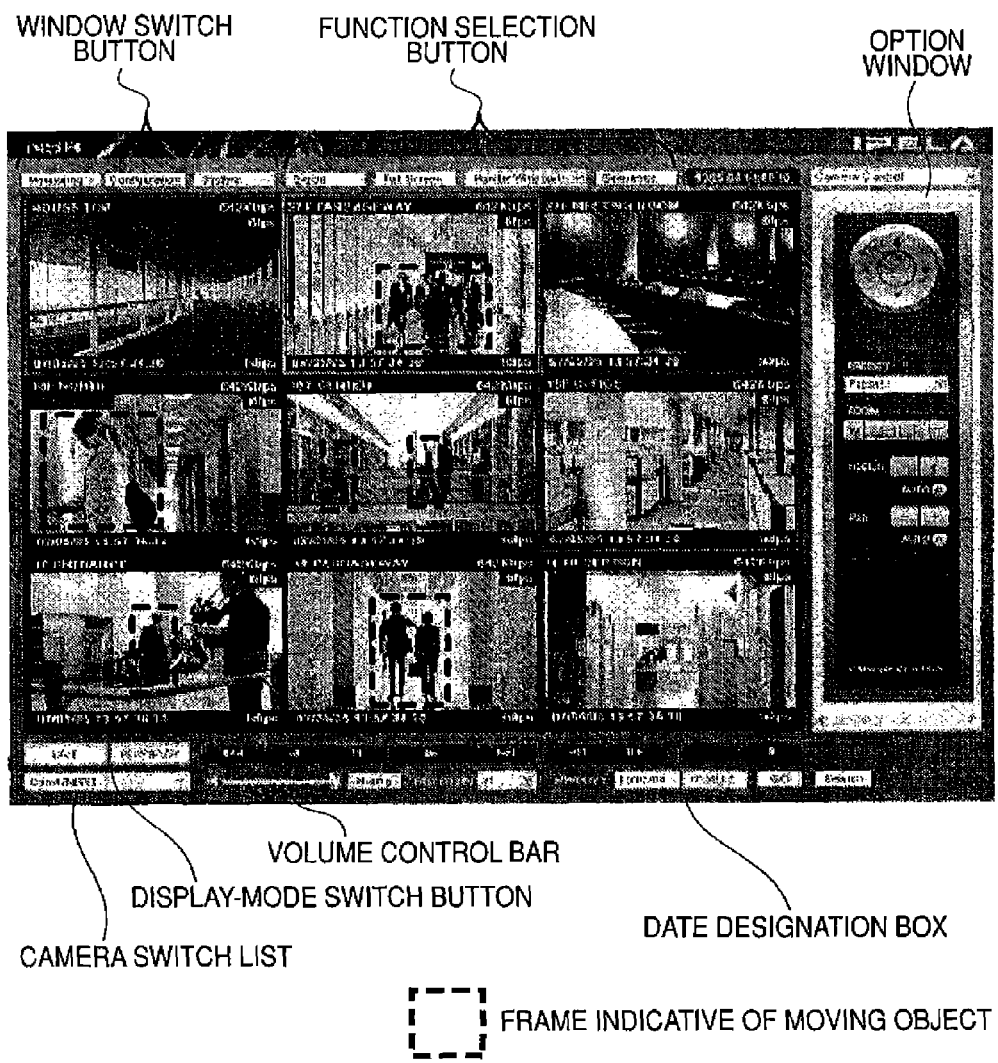
FIG. 5 is a diagram of an example of images captured by a plurality of cameras which are displayed on a monitor.

FIG. 5 is a diagram of an example of images captured by a plurality of cameras which are displayed on a monitor. The images captured by cameras are displayed vertically and horizontally on the respective windows. FIG. 5 shows an example in which 3×3=9 windows are displayed, on which images by different cameras are displayed. That is, images by nine cameras can be watched at the same time. The number and layout of the windows can be switched variously according to user selection.

There are a window switch button and a function selection button above the image display window. The window switch button is for selecting the content to be displayed on the entire screen. To display images by cameras, "Monitoring" button is selected, for basic configuration, "Configuration" button is selected, and for system setting, "System" button is selected.

The function selection button includes "Export" button for outputting an image recorded by a camera to an external recording medium (a CD-RW, a DVD-RW, a USB memory, etc.), "Full Screen" button for displaying a selected window on the entire screen, "Monitor Window" button for selecting the layout of two or more windows (3×3 or 2×2 windows), and "Sequence" button for designating to start or stop a monitor sequence in which the screen is switched automatically.

There are also a button for switching the mode of an image display window (present image display/past image playback), a playback/record operation button, a camera selection button, a slide bar for volume control, and a date designation box for searching for a past image under the entire window.

There is an option window to the right of the entire window. The option window can be switched among "Camera Control", "List of Recording Cameras", "List of Recorded Images", "System Log", "List of Alarm Output States", "List of Sensor Input States", "List of Moving-Object Detecting Modes", and "Manual Trigger" with a window switch button.

When "Camera Control" is selected, the window is switched to a window for controlling the camera functions of a designated window such as pan, tilt, zoom, focus, and brightness. When "List of Recording Cameras" is selected, a list of cameras during video shooting is displayed on the option window. When "List of Recording Images" is selected, a list of recent recorded images is displayed on the option window.

When "Alarm Log" is selected, an alarm log is displayed on the option window. When "System Log" is displayed, a log about system information and error is displayed on the option window. When List of Alarm Output States" is selected, the present state of alarm output is displayed on the option window. When "List of Sensor Input States" is selected, the present state of sensor input is displayed on the option window.

When "List of Moving-Object Detection States" is selected, information on the present moving-object detection is displayed on the option window. When "Manual Trigger" is selected, a manually started action is displayed on the option window.

Which image of camera is to be displayed on which window can be switched freely according to the instruction of the user. More specifically, when the user selects a desired camera with the camera selection button while designating a window, the image of the selected camera is displayed on the designated window. When the user displays "Camera Control" on the option window while designating a window on which an image is displayed, and selects an arrow button, for example, the user can pan or tilt the camera that is sending the image to the window, or zoom in or out the image with a zoom button.

To see an image captured in the past, the user selects a window on which the present image of the camera in which the desired past image is stored, and inputs the desired past date to the date designation box. In this embodiment, the date designation box is displayed on the lower right of the entire window, thus allowing date designation while maintaining the image display state of the window.

Here, the user can designate multiple windows corresponding to the desired camera. Even when multiple windows are designated, one common date setting can be accepted for the multiple windows because there is one date designation box.

In the image monitoring system of the embodiment, moving-object detection can be made for each of window images captured by a plurality of cameras, with the images displayed on the respective windows, and the positions of the detected moving objects can be each indicated by, for example, a rectangular frame (see the broken-line frame in the drawing). When a moving object is detected, a predetermined alarm can be displayed.

Since images by multiple cameras can thus be displayed at the same time, simultaneous moving-object detection for multiple window images applies a significantly heavy load. Therefore, the use of the moving-object detection of this embodiment allows accurate moving-object detection without application of a heavy load on the system even if multiple windows display images.

It should be understood by those skilled in the art that various modifications, combinations, sub-combinations and alterations may occur depending on design requirements and other factors insofar as they are within the scope of the appended claims or the equivalents thereof.

What is claimed is:
1. An image signal processing system comprising:
a low resolution image generating section configured to generate a second image based on a first image having a first resolution captured by a camera device, the second image having a second resolution lower than the first resolution;
an object detection section configured to detect an object in the second image; and
a position information generating section configured to generate position information representing a position of the object in a third image based on a position of the object in the second image, the third image having higher resolution than the second resolution,
wherein the third image and a state of sensor input are outputted for display.

2. An image signal processing apparatus according to claim 1, wherein the position information of the object in the third image is generated by converting position information of the object in the second image to a resolution corresponding to the resolution of third image.

3. An image signal processing system according to claim 1, wherein the third image is output with the position of the object in the third image.

4. An image signal processing system according to claim 1, wherein the outputted third image includes a mark indicating the position of the object in the third image and is displayed.

5. An image signal processing system according to claim 1, further comprising:
one or more camera devices configured to capture a first image.

6. An image signal processing method comprising:
generating a second image based on a first image having a first resolution captured by a camera device, the second image having a second resolution lower than the first resolution;
detecting an object in the second image; and
generating position information representing a position of the object in a third image based on a position of the object in the second image, the third image having higher resolution than the second resolution;
wherein the third image and a state of sensor input are outputted for display.

7. An image signal processing method according to claim 6, wherein the position information of the object in the third image is generated by converting position information of the object in the second image to a resolution corresponding to the resolution of third image.

8. An image signal processing method according to claim 6, wherein the third image is output with the position of the object in the third image.

9. An image signal processing method according to claim 6, wherein the outputted third image includes a mark indicating the position of the object in the third image and is displayed.

10. An image signal processing method according to claim 6, further comprising:
capturing the first image.

11. An image signal processing system comprising:
circuitry configured to:
generate a second image based on a first image having a first resolution captured by a camera device, the second image having a second resolution lower than the first resolution;
detect an object in the second image; and
generate position information representing a position of the object in a third image based on a position of the object in the second image, the third image having higher resolution than the second resolution;
wherein the third image and a state of sensor input are outputted for display.

12. An image signal processing system according to claim 11, further comprising:
one or more camera devices configured to capture a first image.

13. An image signal processing system according to claim 12, wherein the position information of the object in the third image is generated by converting position information of the object in the second image to a resolution corresponding to the resolution of third image.

14. An image signal processing system according to claim 12, wherein the third image is output with the position of the object in the third image.

15. An image signal processing system according to claim 12, wherein the outputted third image includes a mark indicating the position of the object in the third image and is displayed.

16. An image signal processing system according to claim 11, wherein the position information of the object in the third image is generated by converting position information of the object in the second image to a resolution corresponding to the resolution of third image.

17. An image signal processing system according to claim 11, wherein the third image is output with the position of the object in the third image.

18. An image signal processing system according to claim 11, wherein the outputted third image includes a mark indicating the position of the object in the third image and is displayed.

* * * * *